United States Patent [19]
Gornstein et al.

[11] Patent Number: 5,767,917
[45] Date of Patent: Jun. 16, 1998

[54] METHOD AND APPARATUS FOR MULTI-STANDARD DIGITAL TELEVISION SYNCHRONIZATION

[75] Inventors: Viktor L. Gornstein, New York; Alan P. Cavallerano, White Plains, both of N.Y.

[73] Assignee: U.S. Philips Corporation, New York, N.Y.

[21] Appl. No.: 643,068

[22] Filed: Apr. 30, 1996

[51] Int. Cl.[6] ........................................................ H04N 5/46
[52] U.S. Cl. .............................................. 348/543; 348/558
[58] Field of Search .................................. 348/543, 547, 348/558; H04N 5/46

[56] References Cited

U.S. PATENT DOCUMENTS

| | | | |
|---|---|---|---|
| 2,668,193 | 2/1954 | Chapin | 348/543 |
| 4,679,091 | 7/1987 | Kikuchi | 348/543 |
| 4,684,987 | 8/1987 | Tsutsui | 348/543 |
| 5,124,792 | 6/1992 | Shimoka | 348/543 |
| 5,541,556 | 7/1996 | Francis | 348/543 |
| 5,657,090 | 8/1997 | Friesen | 348/558 |

Primary Examiner—Howard W. Britton
Attorney, Agent, or Firm—Edward W. Goodman

[57] ABSTRACT

An apparatus for automatically synchronizing a video system to one of a plurality of composite synchronizing signals in accordance with a plurality of known video formats, includes a number of synchronizing signal stripper circuits, corresponding, respectively, to a number of types of composite synchronizing signals, a horizontal analyzer, having a plurality of horizontal standard identification circuits corresponding to a identification circuits for each known horizontal synchronizing signal rate for each type of composite synchronizing signal, for determining an approximate horizontal synchronizing signal rate and, a vertical analyzer, having a plurality of vertical rate identification circuits corresponding to the number of different known vertical rates, for determining the vertical synchronizing signal rate.

32 Claims, 13 Drawing Sheets

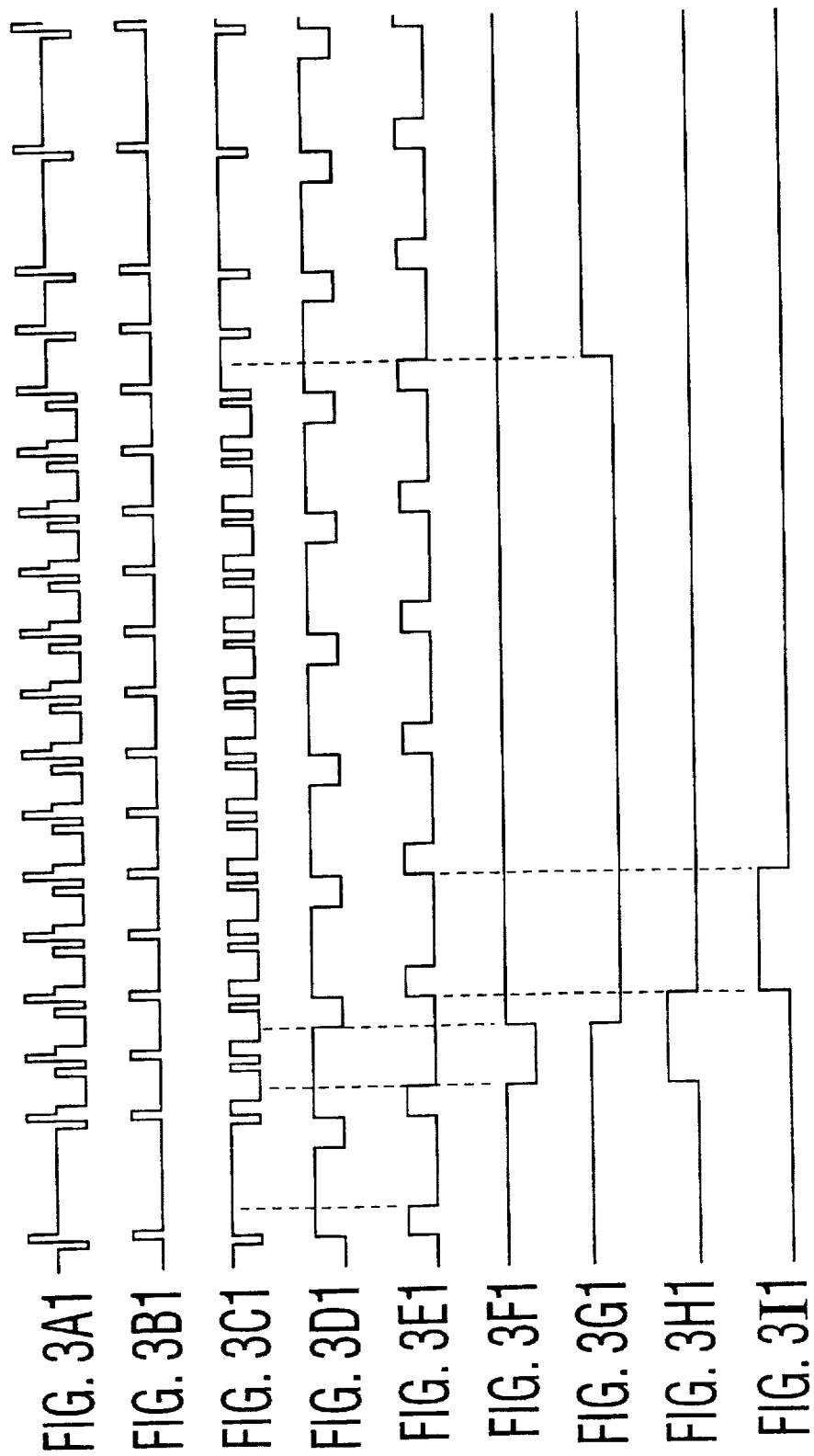

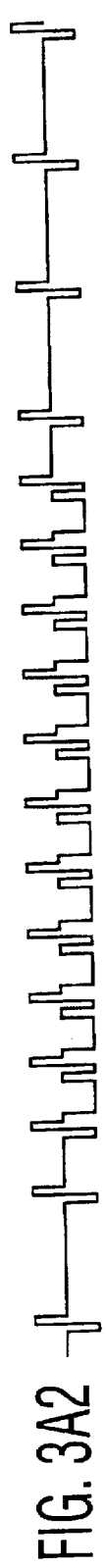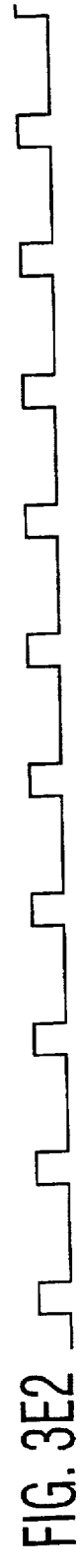
FIG. 3A2  FIG. 3B2  FIG. 3C2  FIG. 3D2  FIG. 3E2  FIG. 3F2  FIG. 3G2  FIG. 3H2  FIG. 3I2

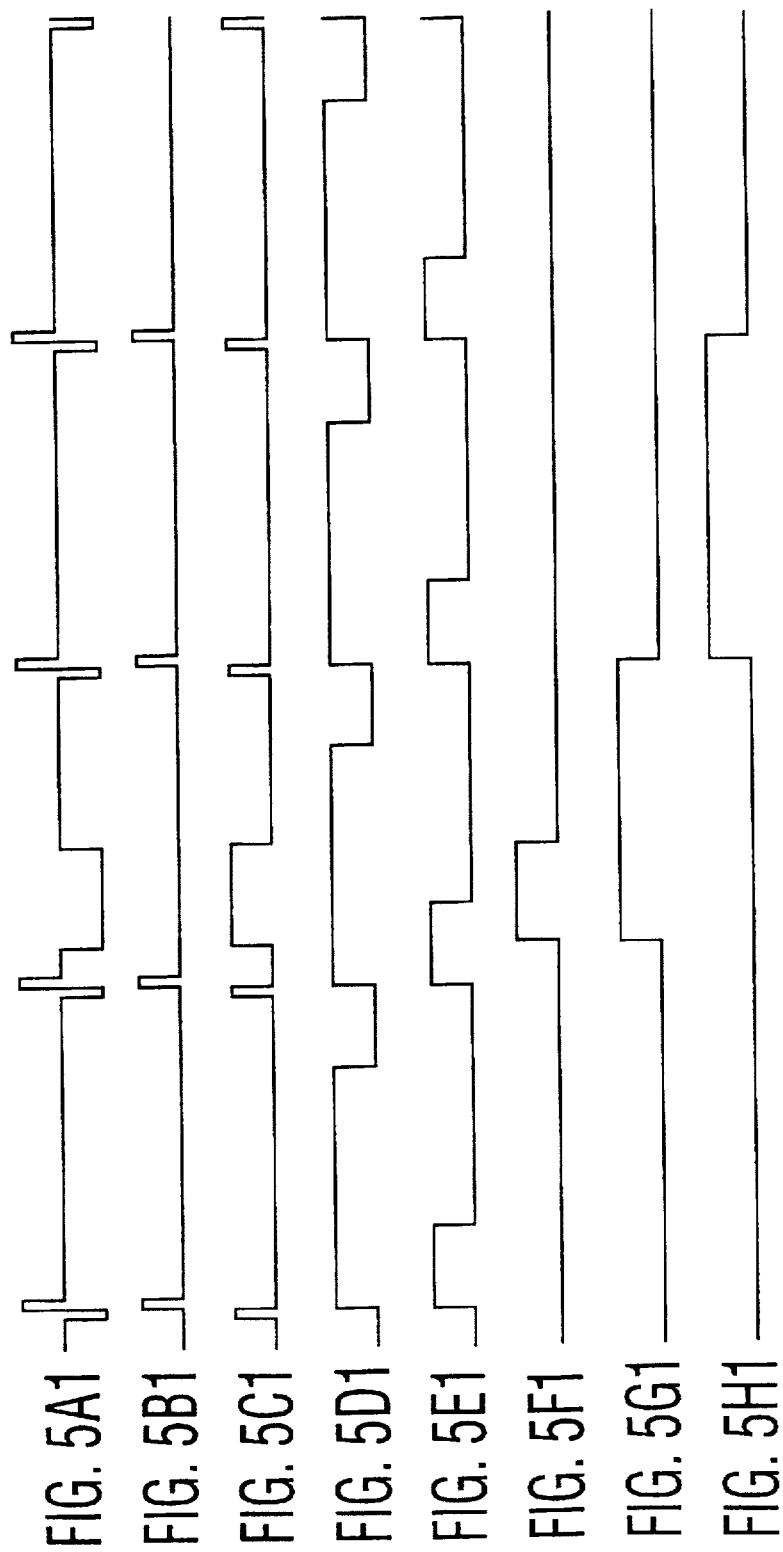

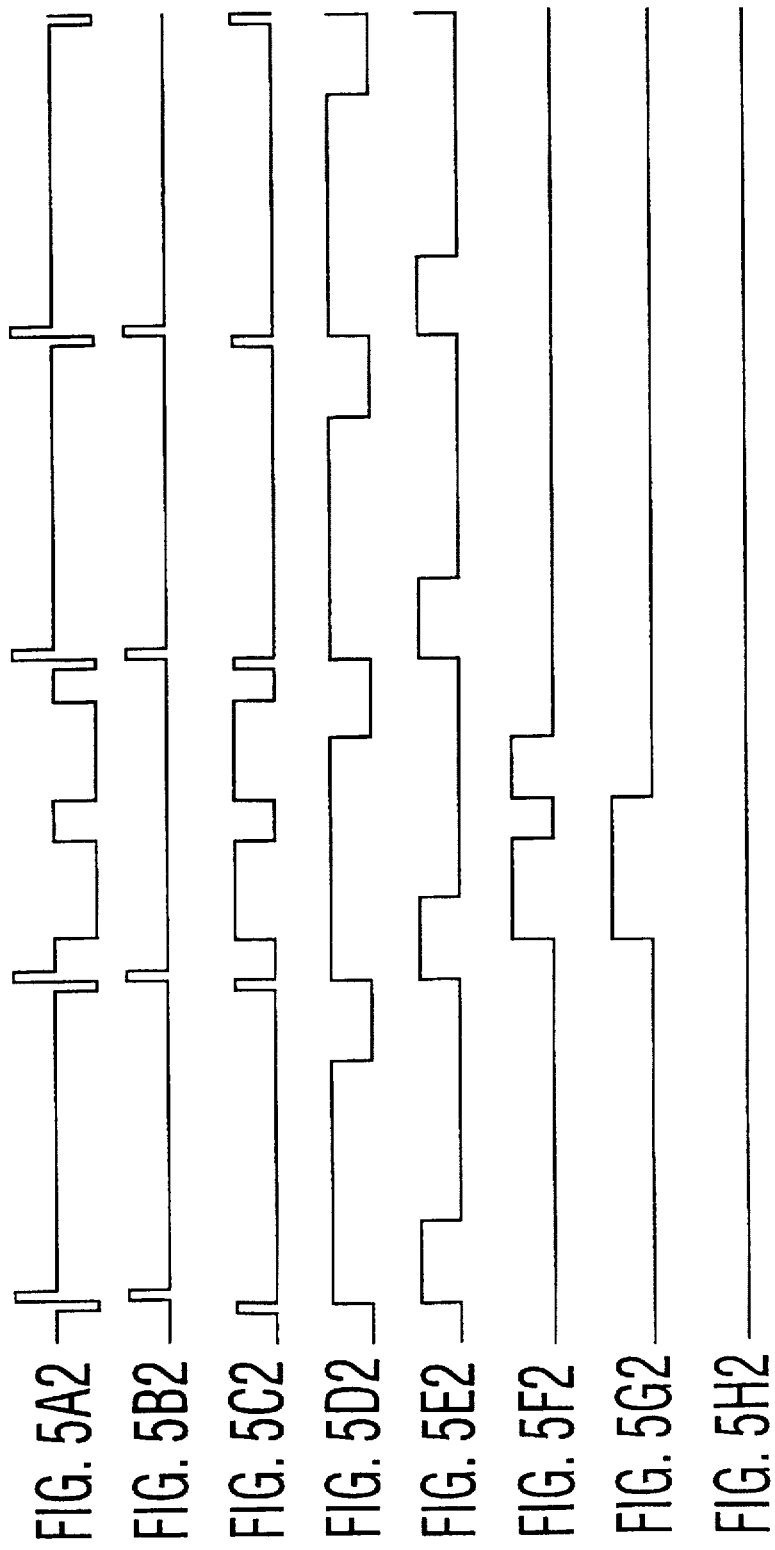

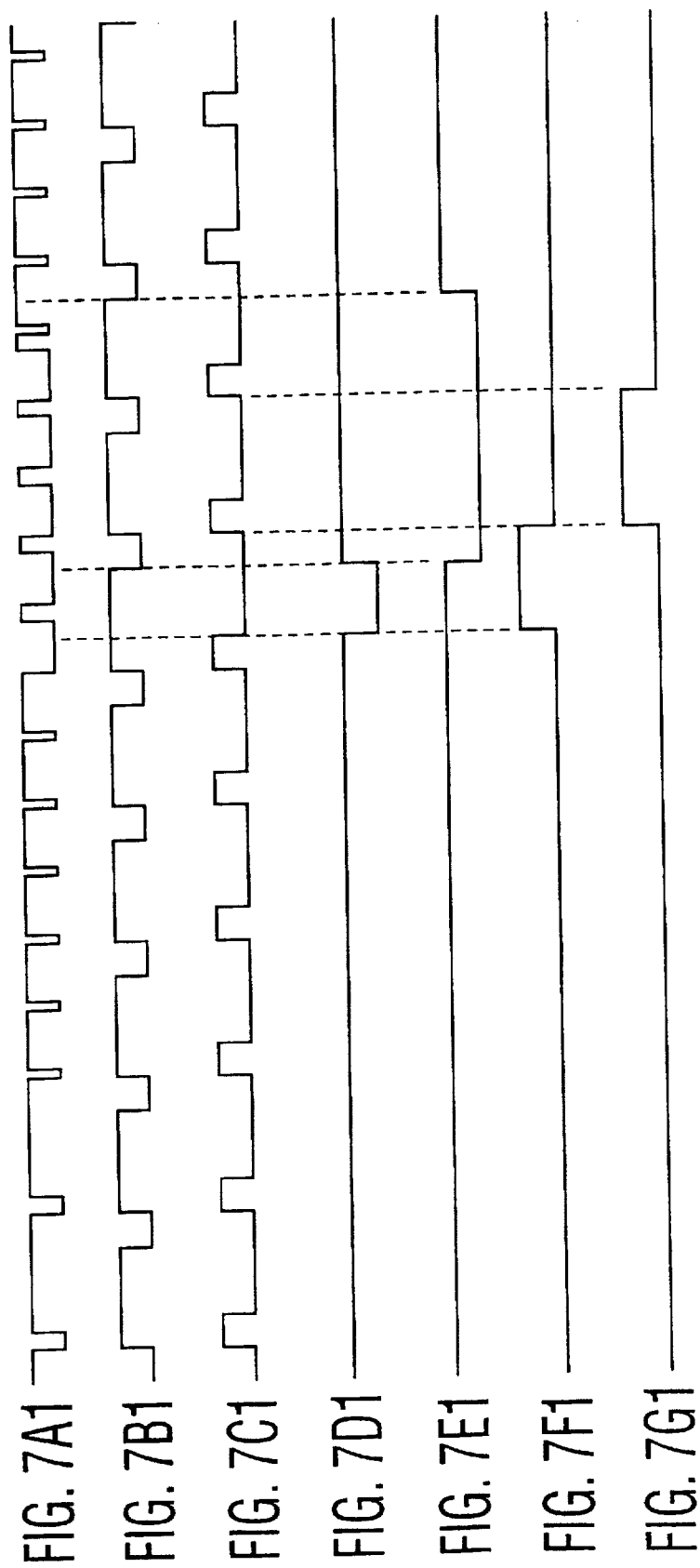

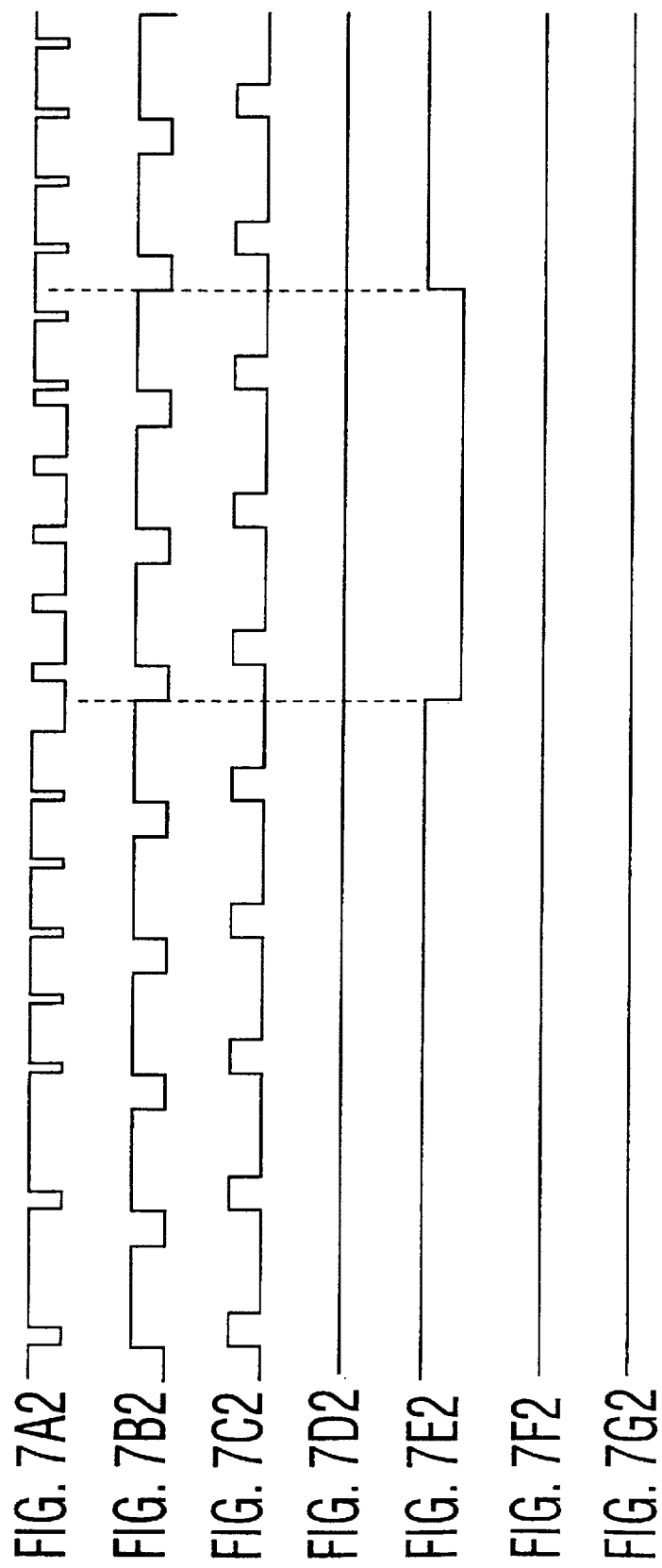

METHOD AND APPARATUS FOR MULTI-STANDARD DIGITAL TELEVISION SYNCHRONIZATION

BACKGROUND OF THE INVENTION

1. Field of the Invention

The present invention relates to the analog front end of a video system intended to operate with digital processing. The video input signals can be in either analog or digital form. Such "digital systems" typically have a family of permissible video input formats, e.g., ATV formats 1125 interlaced and/or 787 progressive (horizontal line rates) which may be at a field/frame rate of either 59.94 or 60 Hz. Each video format has a corresponding "composite sync" signal, which carries the horizontal- and vertical-rate pulses locked to the input video. In addition to the placement of the horizontal and vertical pulses within the signal, the composite signal can take on different types, e.g., it can be bi-level or one of two (or more) types of tri-level, and this is a characteristic of the composite sync signal that needs to be considered as well as the horizontal and vertical pulses that define the video formats. Hence, an actual composite synchronization signal may be one out of a possible twelve (or more) combinations.

2. Description of the Related Art

Digital video systems typically require the generation of multiple clocks and other synchronization signals that are locked to the input composite synchronizing signal, and hence locked to the video signal. A complication arises in these environments with multiple video input standards permissible at the input (front end), because the composite synchronizing signal is typically not identified automatically by the front-end electronics. This is the case both in terms of what rates (of the horizontal and vertical pulses) are imbedded within the composite synchronizing signal (i.e., what is the input format - H and V corresponding to, e.g., 1125 interlaced, or H and V corresponding to, e.g., 787 progressive), and what type of composite synchronizing signal has been inputted (e.g., bilevel or tri-level).

Prior art systems employ multiple coaxial cable inputs, one for each rate (video format) and type (e.g., bilevel or tri-level) of composite synchronizing signal. A physical switch permits the user to select the composite synchronizing signal input that matches the desired input video. The selected composite synchronizing signal is then directed to the processing circuits which strip the horizontal and vertical pulses, and generate the necessary clock frequencies and timing signals for the digital processing in the video system.

SUMMARY OF THE INVENTION

An object of the present invention is to provide a method for automatically detecting the type and rate of the synchronizing signals contained in a composite synchronizing signal. This object is achieved in a method for automatically synchronizing a video system to a composite synchronizing signal in accordance with one of a plurality of known video standards, said method comprising the steps of receiving the composite synchronizing signal; generating a high frequency clock signal with a known pulse frequency controlled within a narrow frequency band; determining whether said composite synchronizing signal is bi-level or tri-level; dividing said composite synchronizing signal into a first signal containing the positive portions and a second signal containing the negative portions, if said composite synchronizing signal is tri-level, forming a second signal of negative portions of said composite synchronizing signal is bi-level; means for analyzing one of said first and said second signals to determine an approximate horizontal frequency rate; stripping the composite synchronizing signal to separate the horizontal synchronizing pulses and vertical synchronizing pulses contained therein using the approximate horizontal frequency rate determined in the horizontal analyzing step; vertical analyzing the stripped vertical synchronizing pulses to determine an accurate vertical rate; locking said high frequency clock signal to the stripped horizontal synchronizing pulses; and identifying one of said plurality of known video standards for which said composite synchronizing signal is in accordance, characterized in that said horizontal analyzing step comprises counting a number of pulses in said high frequency clock pulse signal occurring during a period of said analyzed signal; estimating an expectation window for each of a plurality of known horizontal frequency rates in said plurality of known video standards; and identifying a particular one of said plurality of known horizontal frequency rates by determining in which expectation window an analyzed pulse in said analyzed signal occurs for a predetermined number of times.

A further object of the invention is to provide an apparatus for automatically synchronizing a video system to a composite synchronizing signal in accordance with one of a plurality of known video standards, said apparatus comprising an input for receiving the composite synchronizing signal; a high frequency clock signal generator for generating a clock signal with a known pulse frequency controlled to within a known narrow band; means for determining whether said composite synchronizing signal is bi-level or tri-level; means for dividing said composite synchronizing signal into a first signal containing the positive portions and a second signal containing the negative portions, if said composite synchronizing signal is tri-level, and for forming said second signal containing the negative portions if said composite synchronizing signal is bi-level; a first analyzer for analyzing one of the first and second signals to determine an approximate horizontal frequency rate, said first analyzer having an input coupled to said dividing means, and a clock input coupled to an output of said high frequency clock signal generator; means, coupled to said dividing means and to said first analyzer, for stripping the composite synchronizing signal to separate horizontal synchronizing pulses and vertical synchronizing pulses contained therein using the approximate horizontal frequency rate determined in the first analyzer; a second analyzer, coupled to an output of said stripping means and to said high frequency clock signal generator, for analyzing the stripped vertical synchronizing pulses to determine an accurate vertical rate; means for locking said high frequency clock signal generator to the stripped horizontal synchronizing pulses; and means for identifying one of said plurality of known video standards for which said composite synchronizing signal is in accordance, characterized in that said first analyzer comprising an input for receiving one of the first and second signals; an input for receiving said high frequency clock pulse signal; means for counting a number of pulses in said high frequency clock pulse signal occurring during a period of said analyzed signal; and a plurality of horizontal rate identification circuits corresponding, respectively, to said plurality of known horizontal frequency rates, each of said horizontal rate identification circuits comprising means for forming an expectation window for each of said plurality of known horizontal rates; a state machine for determining whether an analyzed signal has pulses which occur within said expectation window for a predetermined number of times consecutively; and an output for supplying an identification signal.

A still further object of the invention is to provide a method for determining a frequency rate of an input signal out of a plurality of known frequency rates, where signals at said known frequency rates are periodic pulse signals for a substantial portion of time periods and may suffer doubling of frequency during periodic known time intervals of said time periods, said method comprising the steps of receiving the input signal; generating a high frequency clock pulse signal having a known frequency rate, said known frequency rate being variable within a known frequency band; counting a number of pulses in said high frequency clock pulse signal occurring during a period of said analyzed signal; estimating an expectation window for each of said plurality of known frequency rates; identifying a particular one of said plurality of known frequency rates by determining in which expectation window pulses in said analyzed signal occur for a predetermined number of consecutive times; filtering out a doubling of frequency by using an appropriate state machine to avoid false indications of a non-match.

A yet still further object of the invention is to provide an analyzer for determining a frequency rate of an input signal, where signals at said known frequency rates are periodic pulse signals for a substantial portion of time periods and may suffer doubling of frequency during periodic known time intervals of said time periods, said analyzer comprising an input for receiving the input signal; means for generating a high frequency clock pulse signal having a known frequency rate, said known frequency rate being variable within a known frequency band; means for counting a number of pulses in said high frequency clock pulse signal occurring during a period of said input signal; and a plurality of frequency rate identification circuits corresponding, respectively, to said plurality of known frequency rates, each of said frequency rate identification circuits comprising means for estimating an expectation window for each of said plurality of known frequency rates; a state machine for determining whether said input signal has pulses which occur within said expectation window for a predetermined number of times consecutively; an output for supplying an identification signal; and means for filtering out a doubling of frequency to avoid false indications of a non-match.

BRIEF DESCRIPTION OF THE DRAWINGS

With the above and additional objects and advantages in mind as will hereinafter appear, the invention will be described with reference to the accompanying drawings, in which:

FIGS. 3A1–3I1 show a first group of waveforms of the signals for the first synchronizing signal stripper of FIG. 2 while FIGS. 3A2–3I2 show a second group of waveforms of the signals for the first synchronizing signal stripper;

FIGS. 5A1–5H1 show a first group of waveforms of the signals for the second synchronizing signal stripper of FIG. 4, while FIGS. 5A2–5H2 show a second group of waveforms of the signals for the second synchronizing signal stripper;

FIGS. 7A1–7I1 show a first group of waveforms of the signals for the third synchronizing signal stripper of FIG. 6, while FIGS. 7A2–7I2 show a second group of waveforms of the signals for the third synchronizing signal stripper;

DESCRIPTION OF THE PREFERRED EMBODIMENTS

Figure 1:
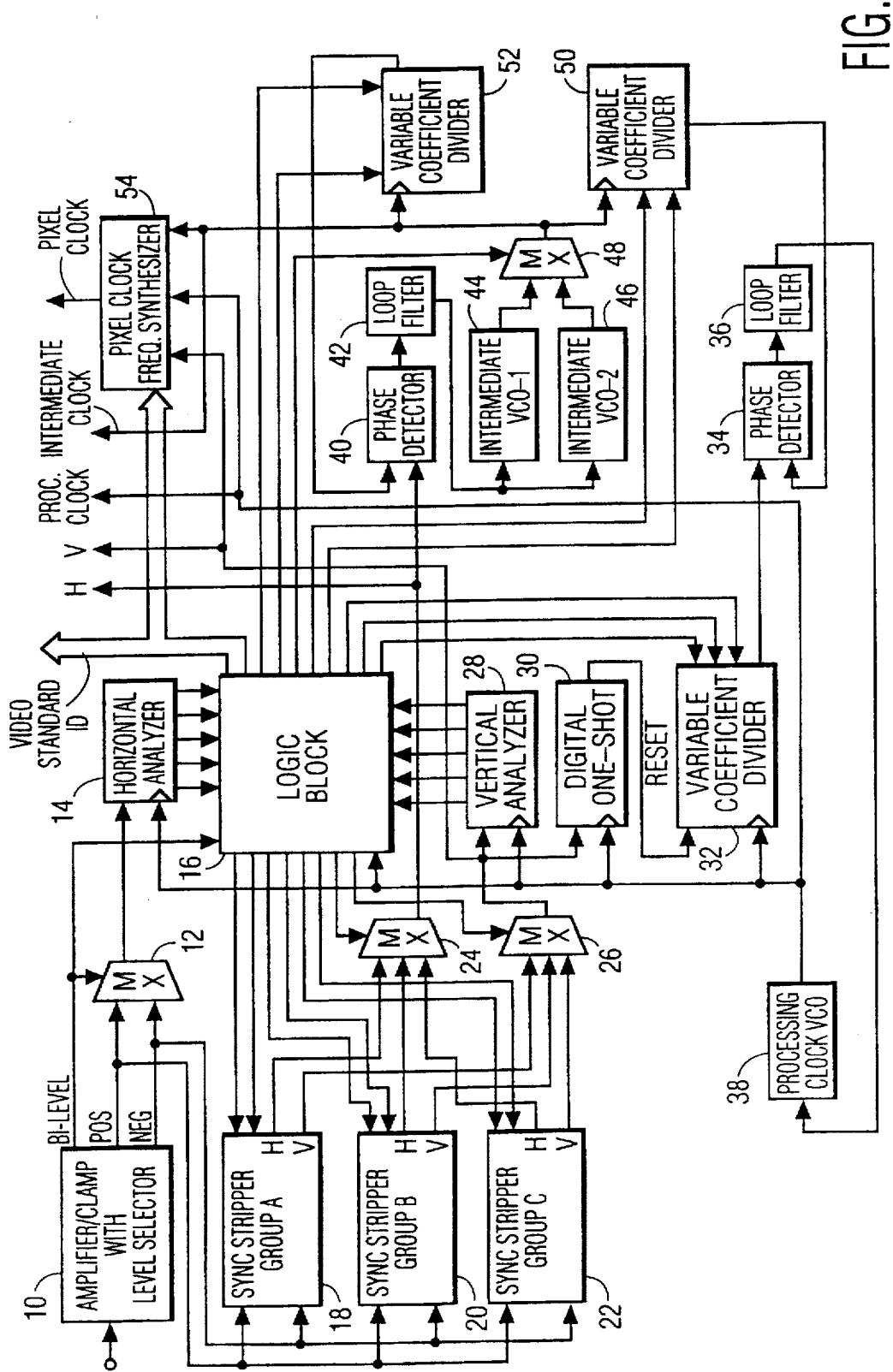
FIG. 1 shows a block diagram of an apparatus for synchronizing a video system to a plurality of composite synchronizing signals in accordance with the invention.

FIG. 1 shows a block diagram of an apparatus for synchronizing a video system according to the invention. The apparatus includes an amplifier/clamp with level selector 10 for receiving a composite synchronizing signal. The amplifier/clamp 10 converts positive and negative portions of the composite synchronizing signal into the form of two logic level signals (see, for example, the waveforms in FIGS. 3B1, 3B2, 3C1, 3C2, 5B1, 5B2, 5C1 and 5C2). In case of bi-level composite synchronizing signals (see FIGS. 7A1–7G1, 7A2–7G2), there is no "positive" signal portion and as such, the amplifier/clamp 10 outputs an active "BI-LEVEL" signal. The positive and negative outputs are applied to a multiplexer 12 which, under control of the BI-LEVEL signal, supplies an output to a horizontal analyzer 14. The horizontal analyzer 14 implements the electronic determination of the horizontal rate and supplies a logic block 16 with the necessary logic signals.

The positive and negative signals are also applied to three synchronizing signal strippers 18, 20 and 22, which also receive enabling signals from the logic block 16 determined by the horizontal analyzer. These synchronizing signal strippers correspond to the three known types of composite synchronizing signals, namely, BTS tri-level, Zenith tri-level and bi-level. The appropriate synchronizing signal stripper is then able to output the appropriate horizontal and vertical synchronizing pulses appearing at the respective outputs of the synchronizing signal strippers. The horizontal signal outputs from the synchronizing signal stripper 18, 20 and 22 are applied to respective inputs of a multiplexer 24, while the vertical signal outputs are applied to a multiplexer 26. These multiplexers 24 and 26 receive the appropriate switching signals from the logic block 16.

The output from the multiplexer 26 is applied to an input of a vertical analyzer 28 which uses the vertical pulses from the multiplexer 26 to implement the electronic determination of the vertical period, providing the appropriate signals to the logic block 16.

The multiplexer 26 further applies the vertical pulses to a digital one-shot circuit 30 which applies its output signal as a reset signal to a variable coefficient divider 32 which receives the coefficient values from the logic block 16. The output from the variable coefficient divider 32 is applied to a first input of a phase detector 34 which applies its output signal through a loop filter 36 and to the control input of a processing clock voltage-controlled oscillator (VCO) 38. VCO 38 provides clock signals for the digital one-shot circuit 30, the vertical analyzer 28, the logic block 16, and the horizontal analyzer 14.

The output from multiplexer 24 is applied to a first input of a phase detector 40 which applies its output through a loop filter 42 and to the control inputs of a first and a second intermediate VCO 44 and 46. The output from the VCO's 44 and 46 are applied to respective inputs of a multiplexer 48 which is controlled by the logic block 16. The output from the multiplexer 48 is applied to the clock signal inputs of variable coefficient dividers 50 and 52 which receive coefficients, respectively, from the logic block 16. The output from variable coefficient divider 50 is applied to the second input of phase detector 34, while the output from variable coefficient divider 52 is applied to the second input of phase detector 40.

The outputs from multiplexers 24 and 48, and VCO 38 are applied to inputs of a pixel clock frequency synthesizer 54 which receives a video standard ID signal from the logic block 16, and which generates a pixel clock signal.

In operation, the amplifier/clamp with level selector 10 receives the composite synchronizing signal and determines whether the composite synchronizing signal is a bi-level or tri-level signal. If the composite synchronizing signal is a bi-level, the amplifier/clamp with level selector 10 outputs a "high" signal on the bi-level output which causes the multiplexer 12 to select the "negative" output. The amplifier/clamp with level selector 10 then outputs the negative pulses of the bi-level composite synchronizing signal. If the composite synchronizing signal is tri-level, the amplifier/clamp with level selector 10 the separates the composite synchronizing signal into its positive and negative pulses and the multiplexer 12 selects the positive pulses therefrom.

At this time, the processing clock VCO 38 is free running and outputs a pulse train with a frequency of approximately, 27 MHz. Using this approximate clock frequency, and the pulses from the multiplexer 12, the horizontal analyzer 14 determines an approximate rate for the horizontal synchronizing signal contained in the composite synchronizing signal. Using this information, the logic circuit 16 then outputs control information for the sync. strippers 18, 20 and 22 which each attempt to strip the composite synchronizing signal of the horizontal and vertical synchronizing signals. Since it is already known whether the composite synchronizing signal is bi-level or tri-level, and the approximate horizontal rate, the logic block 16 selects the appropriate sync. stripper 18, 20 and 22 by applying the appropriate switching signal to the multiplexers 24 and 26.

At this time, the output from multiplexer 26 is applied to the vertical analyzer 28 which, using the clock signal from the processing clock VCO 38, determines the accurate vertical rate and applies the same to the logic block 16. Based on this information, the logic block 16 determines the correct video standard and outputs this information on the video standard ID outputs, and outputs the divider coefficients for the dividers 32, 50 and 52.

The logic block 16 also switches to the appropriate intermediate VCO 44 and 46 by a switching signal to the multiplexer 48 which then activates the phase-locked loop for the processing clock VCO 38, locking this VCO 38 to the stripped horizontal pulses.

Figure 2:
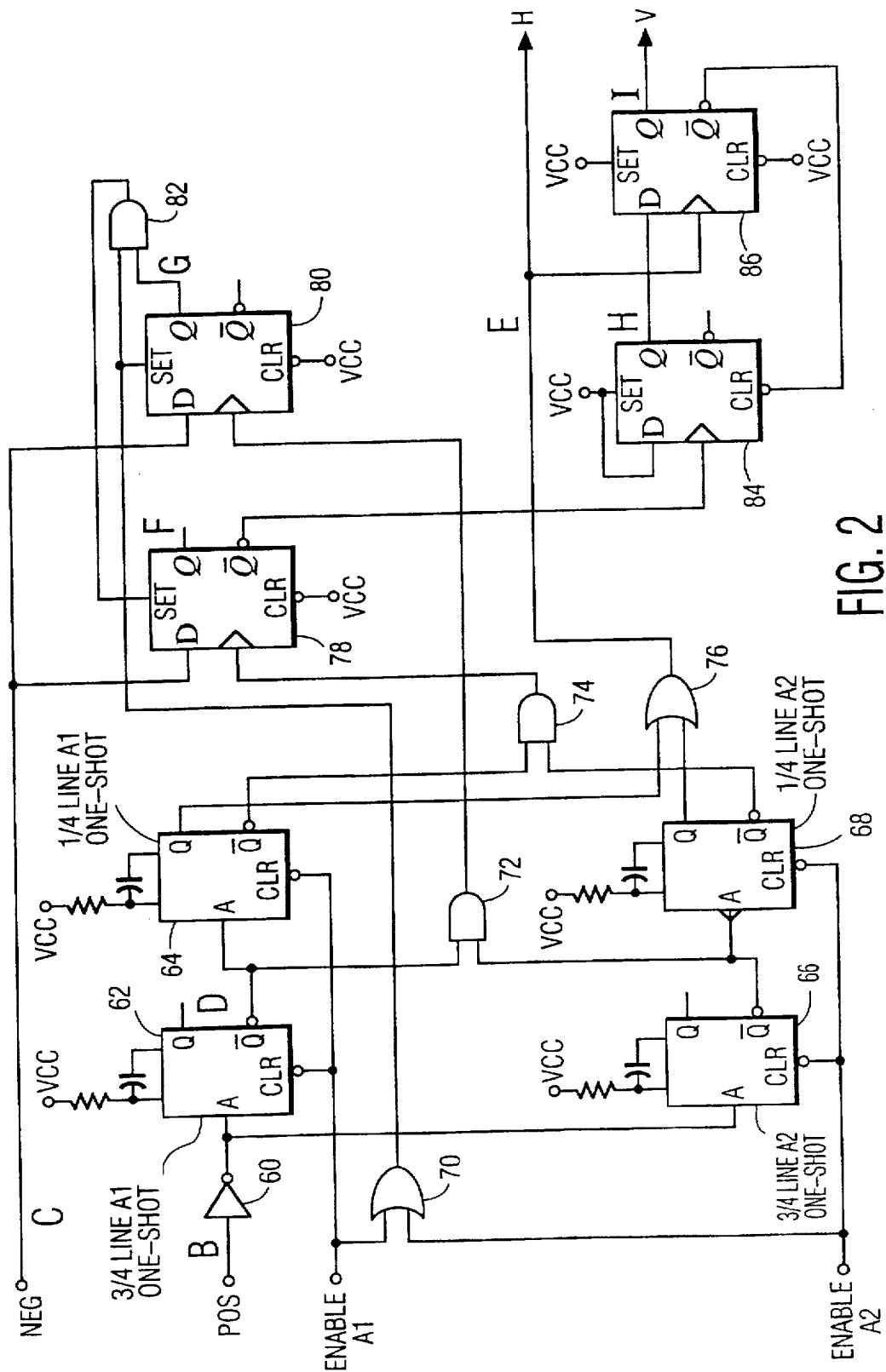
FIG. 2 shows a block diagram of a first synchronizing signal stripper for the apparatus of FIG. 1.

As noted above, the three synchronizing signal strippers 18, 20 and 22, are arranged to correspond to the three known types of composite synchronizing signals. FIG. 2 shows a block diagram for synchronizing signal stripper 18 for BTS tri-level signals. The positive input is applied to an inverter 60 which is connected to the input of a first one-shot circuit 62 which is dimensioned to output a pulse at ¾ of the line period of a synchronizing signal corresponding to an interlaced 1125-line standard (A1). A $\bar{Q}$ output from the first one-shot circuit 62 is applied to an input of a second one-shot circuit 64 which is dimensioned to output a pulse at ¼ of the line period of a synchronizing signal also corresponding to the interlaced 1125-line standard. The enable A1 input is applied to the clear inputs of the first and second one-shot circuits 62 and 64.

The output from the inverter 60 is also applied to the input of a third one-shot circuit 66 which is dimensioned to output a pulse at ¾ of the line period of a synchronizing signal corresponding to an SVGA 600×800 standard (A2). The $\bar{Q}$ output from the third one-shot circuit 66 is applied to the input of a fourth one-shot circuit 68 which is dimensioned to output a pulse at ¼ of the line period of a synchronizing signal also corresponding to the SVGA 600×800 standard. The enable A2 input is applied to the clear inputs of the third and fourth one-shot circuits 66 and 68.

An OR-gate 70 receives the two enable signals A1 and A2, a first AND-gate 72 receives the Q outputs from the first and third one-shot circuits 62 and 66, and a second AND-gate 74 receives the $\bar{Q}$ outputs from the second and fourth one-shot circuits 64 and 68. An OR-gate 76 receives the Q outputs from the second and fourth one-shot circuits 64 and 68 and generates the horizontal (H) synchronizing signal.

A first D-type flip-flop 78 has a clock input connected to the output of the AND-gate 74, a D input connected to the negative input of the synchronizing signal stripper, and a clear input connected to a reference potential Vcc. A second D-type flip-flop 80 has a clock input connected to the output of the AND-gate 72, a D input also connected to the negative input, a set input connected to the output of the OR-gate 70, and a clear input connected to the reference potential Vcc. The Q output from the second D-type flip-flop 80 is connected to a first input of an AND-gate 82 which receives the output from OR-gate 70 at its second input. The output from the AND-gate 82 is connected to the set input of the first D-type flip-flop 78.

A third D-type flip-flop 84 has a clock input connected to the $\bar{Q}$ output of the first D-type flip-flop 78. The D input and the set input of the third D-type flip-flop 84 is connected to the reference potential Vcc. The Q output from the third D-type flip-flop 84 is connected to the D input of a fourth D-type flip-flop 86 which has a clock input connected to the output of OR-gate 76. The set and clear inputs of the fourth D-type flip-flop 86 are connected to the reference potential Vcc, and $\bar{Q}$ output from the fourth D-type flip-flop 86 is connected to the clear input of the third D-type flip-flop 84. The Q output from the fourth D-type flip-flop 86 carries the vertical (V) synchronizing signal.

FIGS. 3A1–3I1 show a first group of waveforms for the synchronizing signal stripper 18 of FIG. 2, which correspond to the interlaced 1125 standard. FIG. 3A1 shows the composite synchronizing signal, while 3B1–3I1 show various signals which may appear in the stripper 18. FIGS. 3A2–3I2 show, alternatively, a second group of waveforms for the synchronizing signal stripper 18 of FIG. 2, which correspond to SVGA 600×800 standard.

Figure 4:
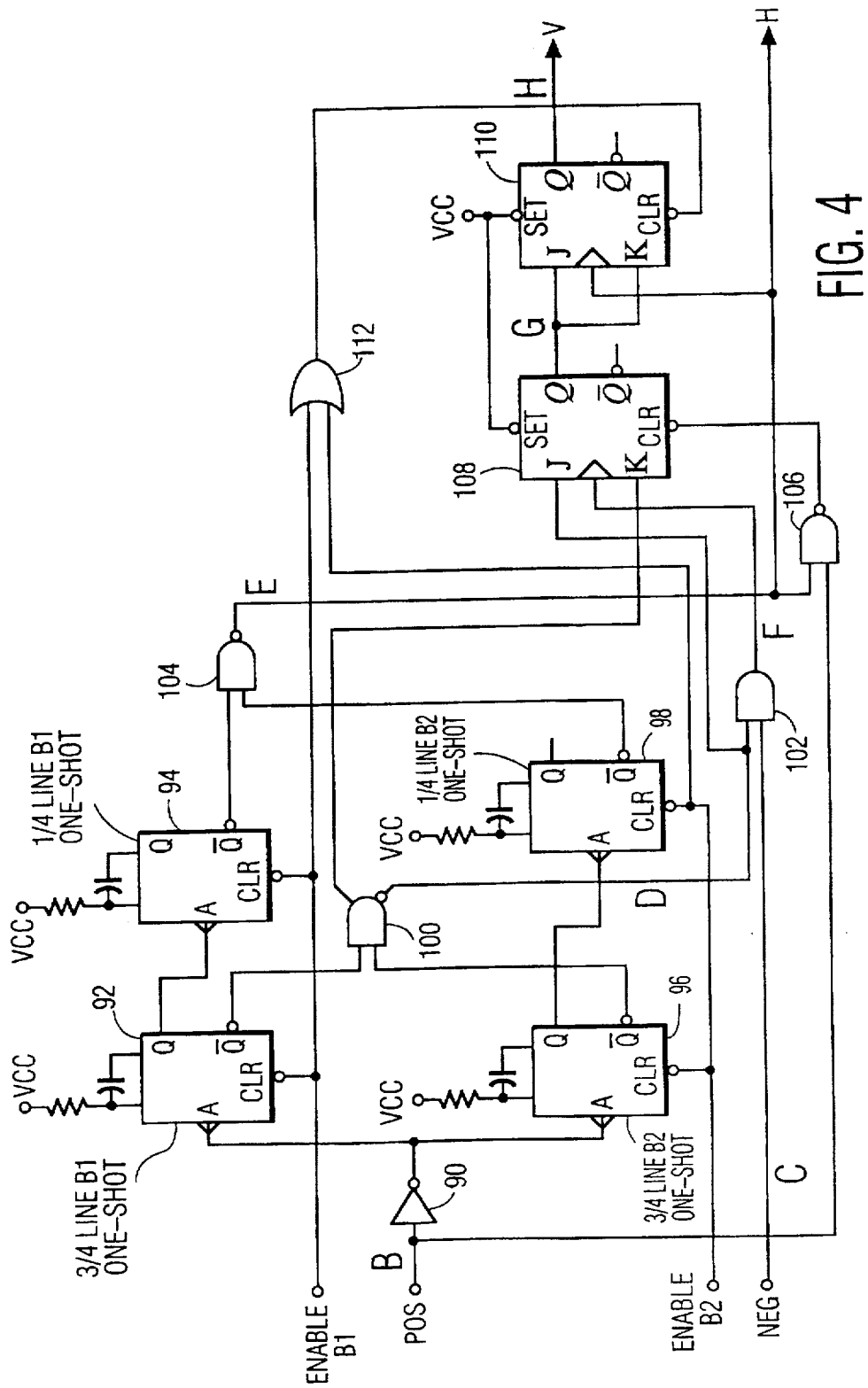
FIG. 4 show a block diagram of a second synchronizing signal stripper for the apparatus of FIG. 1.

FIG. 4 shows a block diagram for the synchronizing signal stripper 20 for Zenith tri-level composite synchronizing signals. An inverter 90 receives the positive input and is connected to an input of a first one-shot circuit 92 which is dimensioned to output a pulse at ¾ of the line period of a synchronizing signal corresponding to a progressive 787-line standard (B1). A Q output from the first one-shot circuit 92 is connected to the input of a second one-shot circuit 94 which is dimensioned to output a pulse at ¼ of the line period of a synchronizing signal also corresponding to the progressive 787-line standard. Clear inputs of the first and second one-shot circuits 92 and 94 are connected to the first enable B1 input.

The inverter 90 is also connected to the input of a third one-shot circuit 96 which is dimensioned to output a pulse at ¾ of the line period of a synchronizing signal corresponding to a progressive VGA 400×600 standard (B2). A Q output of the third one-shot circuit 96 is connected to the input of a fourth one-shot circuit 98 which is dimensioned to output a pulse at ¼ of the line period of a synchronizing signal also corresponding to the progressive VGA 400×600 standard.

A NAND/AND-gate 100 is connected to the $\overline{Q}$ outputs of the first and third one-shot circuits 92 and 96. An AND-gate 102 is connected to the NAND output of NAND/AND-gate 100, and to the negative input of the synchronizing signal stripper 20. A first NAND-gate 104 is connected to the $\overline{Q}$ outputs of the second and fourth one-shot circuits 94 and 98. A second NAND-gate 106 is connected to the output of the first NAND-gate 104 and to the positive input of the synchronizing signal stripper 20.

A first JK flip-flop 108 has a clock input connected to the output of the AND-gate 102, a J input connected to the AND output of the NAND/AND-gate 100, a K input connected to the NAND output of the NAND/AND-gate 100, and a clear input connected to the output of the second NAND-gate 106. A second JK flip-flop 110 has a clock input connected to the output of the NAND-gate 104, and J and K inputs connected to the Q output of the first JK flip-flop 108. An OR-gate 112 has inputs connected to the enable inputs (B1, B2) of the synchronizing signal stripper 20 and an output connected to the clear input of the second JK flip-flop 110. The set inputs of both of the first and second JK flip-flops 108 and 110 are connected to the reference potential Vcc. The Q output from the second JK flip-flop 110 forms the vertical (V) synchronizing signal, while the output from NAND-gate 104 forms the horizontal (H) synchronizing signal.

FIGS. 5A1–5H1 show a first group of waveforms for the synchronizing signal stripper 20 of FIG. 2, which correspond to the progressive 787-line standard. FIG. 5A1 shows the composite synchronizing signal, while 5B1–5H1 show various signals which may appear in the stripper 20. FIGS. 5A2–5H2 show, alternatively, a second group of waveforms for the synchronizing signal stripper 20 of FIG. 2, which correspond to the progressive VGA 400×600 standard.

Figure 6:
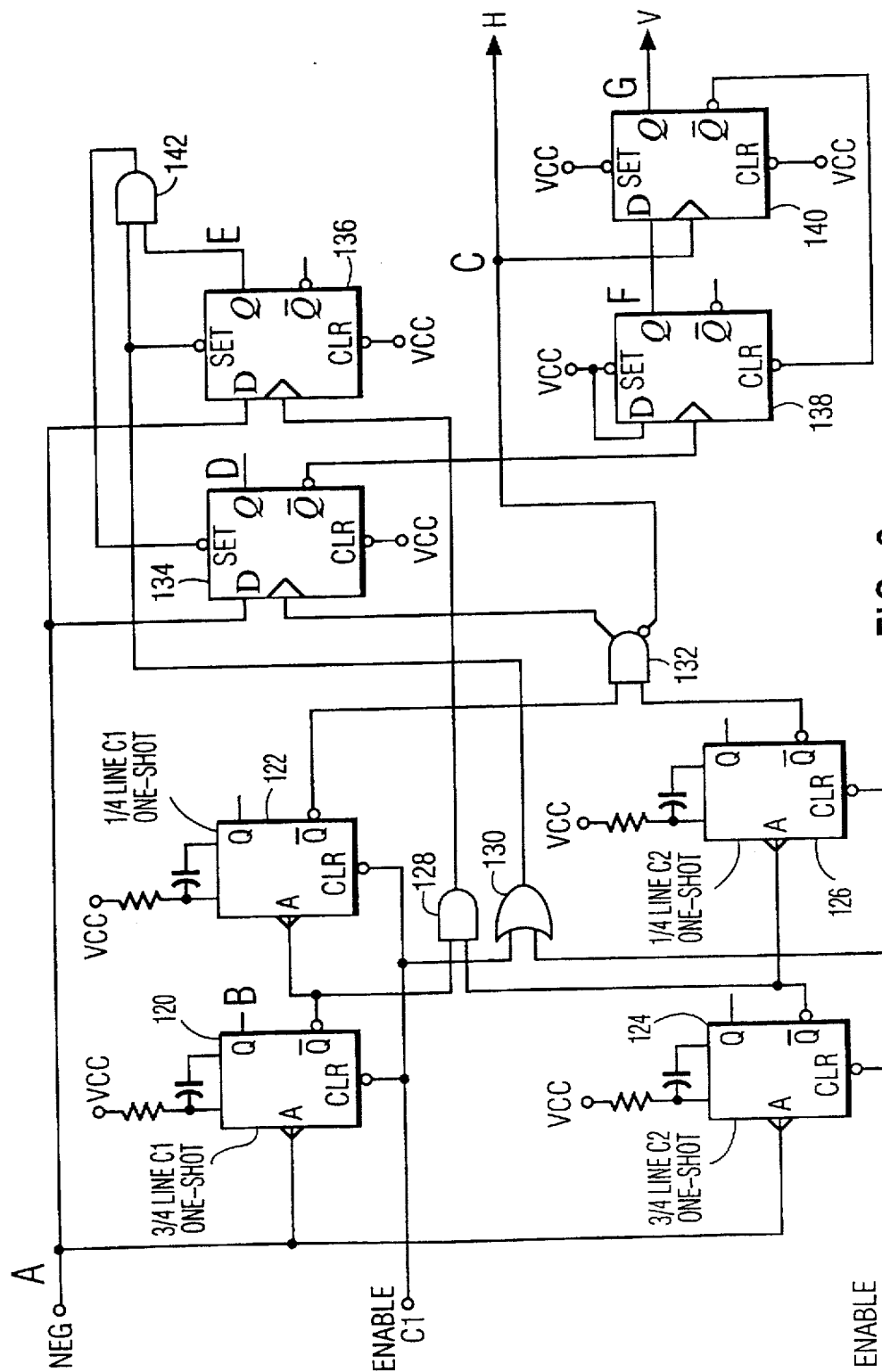
FIG. 6 shows a block diagram of a third synchronizing signal stripper for the apparatus of FIG. 1.

FIG. 6 shows a block diagram of the synchronizing signal stripper 22 for bi-level composite synchronizing signals. A first one-shot circuit 120, which is dimensioned to output a pulse at ¾ of a line period of a synchronizing signal corresponding to the NTSC 525-line standard (C1), has an input connected to the negative input of the synchronizing signal stripper 22. A $\overline{Q}$ output of the first one-shot circuit 120 is connected to an input of a second one-shot circuit 122 which is dimensioned to output a pulse at ¼ of a line period of a synchronizing signal also corresponding to the NTSC 525-line standard. Clear inputs of the first and second one-shot circuits 120 and 122 are connected to the enable C1 input of the synchronizing signal stripper 22. A third one-shot circuit 124, dimensioned to output a pulse at ¾ of the line period of a synchronizing signal corresponding to an ME-SECAM 625-line (30 Hz.) standard (C2), has an input also connected to the negative input. A fourth one-shot circuit 126, dimensioned to output a pulse at ¼ of the line period of a synchronizing signal also corresponding to the ME-SECAM 625-line (30 Hz.) standard, has an input connected to the $\overline{Q}$ output of the third one-shot circuit 124.

A first AND-gate 128 has inputs connected to the $\overline{Q}$ outputs of the first and third one-shot circuits 120 and 124. An OR-gate 130 has inputs connected to the enable inputs (C1, C2) of the synchronizing signal stripper 22. A NAND/AND-gate 132 has inputs connected to the $\overline{Q}$ outputs of the second and fourth one-shot circuits 122 and 126.

A first D-type flip-flop 134 has a clock input connected to the AND output of the NAND/AND-gate 132, a D input connected to the negative input of the synchronizing signal stripper 22, and a clear input connected to a reference potential Vcc. A second D-type flip-flop 136 has a clock input connected to the output of the first AND-gate 128, a D input connected to the negative input, a set input connected to the output of OR-gate 130, and a clear input connected to the reference potential Vcc. A third D-type flip-flop 138 has a clock input connected to the Q output of the first D-type flip-flop 134, and D and set inputs connected to the reference potential Vcc. A fourth D-type flip-flop 140 has a clock input connected to the NAND output of the NAND/AND-gate 132, a D input connected to the Q output of the third D-type flip-flop 138, set and clear inputs connected to the reference potential Vcc, and a $\overline{Q}$ output connected to the clear input of the third D-type flip-flop 138.

A second AND-gate 142 has inputs connected to the output of the OR-gate 130 and the Q output of the second D-type flip-flop 136. The NAND output of the NAND/AND-gate 132 forms the horizontal (H) synchronizing signal, and the Q output of the fourth D-type flip-flop 140 forms the vertical (V) synchronizing signal.

FIGS. 7A1–7G1 show a first group of waveforms for the synchronizing signal stripper 20 of FIG. 2, which correspond to a field/frame rate of 29.97 Hz. FIGS. 7A1–7G1 show various signals which may appear in the stripper 20. FIGS. 7A2–7G2 show, alternatively, a second group of waveforms for the synchronizing signal stripper 20 of FIG. 2, which correspond to a field/frame rate of 30 Hz.

Figure 8:
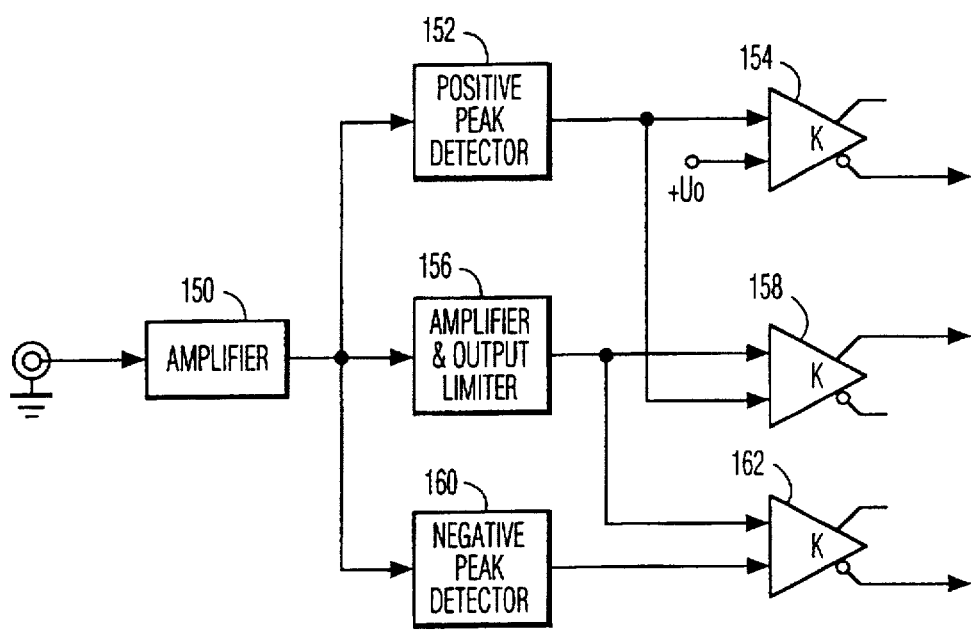
FIG. 8 shows a block diagram of the amplifier/clamp with level selector for the apparatus of FIG. 1.

FIG. 8 shows a block diagram of the amplifier/clamp and level selector 10 of the apparatus of FIG. 2. In particular, the composite synchronizing signal is applied to an amplifier 150 which applies an output signal to a positive peak detector 152. An output from the positive peak detector 152 is applied to a first input of a first operational amplifier 154 having an amplification factor of K. A second input of the first operational amplifier 154 receives a reference potential +Uo. An inverting output from the first operational amplifier 154 provides the positive output.

The output from the amplifier 150 is also applied to an amplifier and output limiter 156 which applies an output signal to a first input of a second operational amplifier 158 having an amplification factor of K, while a second input of the second operational amplifier 158 receives the output from the positive peak detector 152. A non-inverting output from the second operational amplifier 158 provides the bi-level signal. Finally, the output from the amplifier 150 is applied to a negative peak detector 160 which applies its output signal to a first input of a third operational amplifier 162 having an amplification factor of K. A second input of the third operational amplifier 162 receives the output from the amplifier and output limiter 156, and supplies the negative output signal.

Figure 9:
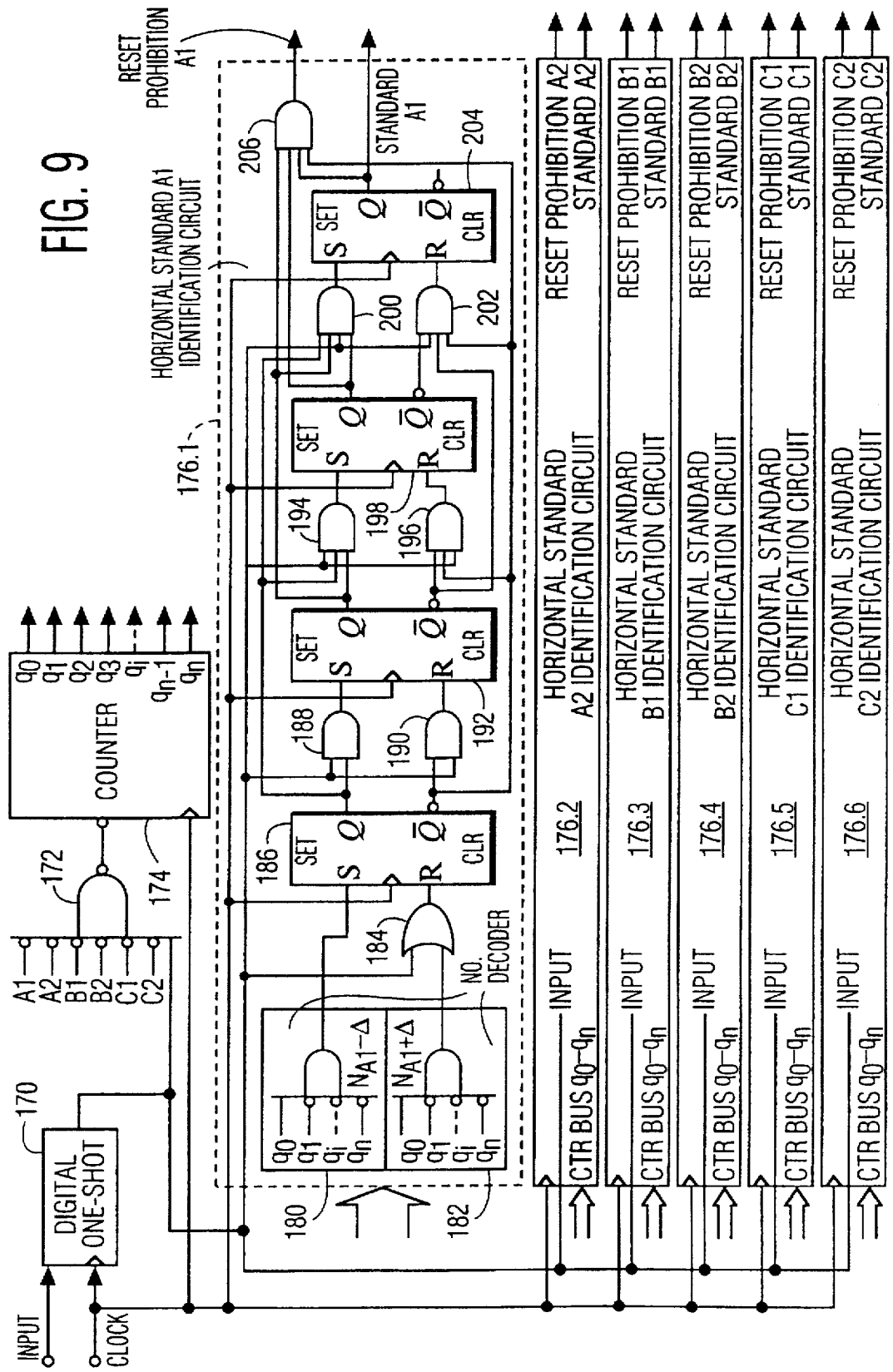
FIG. 9 shows a block diagram of the horizontal analyzer for the apparatus of FIG. 1.

FIG. 9 shows a block diagram of the horizontal analyzer 14 of the apparatus of FIG. 1. In the horizontal analyzer 14, the output from the multiplexer 12 is connected to a digital one-shot circuit 170 which receives the clock signal from the processing clock VCO 38. On receipt of a signal on the input, at the start of a next clock pulse, the digital one-shot circuit 170 outputs a pulse of a predetermined duration. An output from the digital one-shot circuit 170 is applied to one input of a multiple-input inhibitor 172 in the form of a multiple-input NAND-gate. The output from the inhibitor 172 is applied to a reset input of a counter 174 which receives the clock signal as a counting signal. The horizontal analyzer 14 further includes a plurality of horizontal standard identification circuits 176.1–176.6. Each horizontal standard identification circuit 176.i is arranged to approximately identify one of two horizontal rates for each of the three types of composite synchronizing signals.

Each horizontal standard identification circuit 176.i includes a set of data inputs coupled to the outputs of the counter 174, a first input coupled to the clock input, and a second input coupled to the output of the digital one-shot circuit 170. The horizontal standard identification circuits 176.i includes a first and a second number decoder 180 and 182 having inputs coupled, respectively, to the set of data inputs. In the number decoders 180 and 182, if the number of the processing clock periods per line of some video format (for example, A1) rounded to the closest integer is $N_{A1}$, the window of expectation for the next pulse can be set between $N_{A1}-\Delta$ and $N_{A1}+\Delta$, where $\Delta$ is an integer error corresponding to the maximum frequency offset of the unlocked intermediate clock VCO. An OR-gate 184 has inputs coupled to an output of the second number decoder 182 and the second input. A first RS flip-flop 186 has a clock input coupled to the first input, an S input coupled to the second input, and an R input coupled to the output of the OR-gate 184. A first and second AND-gate 188 and 190 have respective first inputs coupled to the second input, the first AND-gate 188 having a second input coupled to the Q output of the first RS flip-flop 186 and the second AND-gate 190 has a second input coupled to the $\overline{Q}$ output of the first RS flip-flop 186. A second RS flip-flop 192 has a clock input coupled to the first input, an S input coupled to the output of the first AND-gate 188 and an R input coupled to the output of the second AND-gate 190.

A third AND-gate 194 has a first input connected to the Q output of the second RS flip-flop 192, a second input connected to the Q output of the first RS flip-flop 186 and a third input connected to the second input of the circuit 176.i. A fourth AND-gate 196 has a first input connected to the $\overline{Q}$ output of the second RS flip-flop 192, a second input connected to the $\overline{Q}$ output of the first RS flip-flop 186 and a third input connected to the second input of the circuit 176.i. A third RS flip-flop 198 has a clock input connected to the first input of the circuit 176.i, an S input connected to the output of the third AND-gate 194, and an R input connected to the output of the fourth AND-gate 196.

A fifth AND-gate 200 has a first input connected to the Q output of the third RS flip-flop 198, a second input connected to the Q output of the second RS flip-flop 192, a third input connected to the Q output of the first RS flip-flop 186 and a fourth input connected to the second input of the circuit 176.i. A sixth AND-gate 202 has a first input connected to the $\overline{Q}$ output of the third RS flip-flop 198, a second input connected to the $\overline{Q}$ output of the second RS flip-flop 192, a third input connected to the $\overline{Q}$ output of the first RS flip-flop 186 and a fourth input connected to the second input of the circuit 176.i.

A fourth RS flip-flop 204 has a clock input connected to the first input of the circuit 176.i, an S input connected to the output of the fifth AND-gate 200, and an R input connected to the output of the sixth AND-gate 202. Finally, a seventh AND-gate 206 has a first input connected to the Q output of the fourth RS flip-flop 204, a second input connected to the Q output of the third RS flip-flop 198, a third input connected to the Q output of the second RS flip-flop 192, and a fourth input connected to the $\overline{Q}$ output of the first flip-flop 186. An output of the seventh AND-gate 206 is connected to a respective one of the inputs of the inhibitor 172, while the Q output of the fourth RS flip-flop 204 forms an identification signal for the respective horizontal signal standard.

The first RS flip-flop 186 is set by the $N_{A1}-\Delta$ number decoder 180 and is reset by the $N_{A1}+\Delta$ decoder 182, or by the next pulse from the digital one-shot circuit 170, whichever is sooner. In this way, the first RS flip-flop 186 is set for the period of the expectation window from the moment when the number in the counter 174 is $N_{A1}-\Delta+1$ to the next horizontal pulse, or the moment when the number in the counter is $N_{A1}+\Delta+1$. If the horizontal pulse from the digital one-shot circuit 170 comes in the interval of the expectation window when the first RS flip-flop 186 is set, the pulse sets the second RS flip-flop 192. If two consecutive horizontal pulses come inside of the time interval of the expectation window, this will set the third RS flip-flop 198. If three consecutive pulses come inside of the expectation window, the fourth RS flip-flop 204 is set, resulting in the sending out of the corresponding horizontal rate identification signal. If the second, third and fourth RS flip-flops 192, 198 and 204 are simultaneously set and the current horizontal rate is identified, the circuit is protected from being reset by the horizontal frequency doubling. In this case, the identification circuit 176.i sends the reset prohibition signal to the inhibitor 172 for all the time outside of the expectation window. If, after that time, a pulse comes from the digital one-shot circuit 170 outside of the window of expectation, the counter 174 will not be reset. The only result in this case will be the reset of the second RS flip-flop 192. To reset the third RS flip-flop 198, two consecutive horizontal pulses outside of the expectation window are required. Three consecutive pulses outside of the window are required (which is impossible due to the simple frequency doubling) to reset the fourth RS flip-flop 204 and turn the current horizontal rate indication signal off.

In a practical embodiment of the horizontal analyzer 14, in the horizontal standard A1 and A2 identification circuits 176.1 and 176.2, $N_{A1/A2}=572$, while $\Delta=6$, in the circuits 176.3 and 176.4, $N_{B1/B2}=800$, while $\Delta=8$, and in the circuits 176.5 and 176.6, $N_{C1/C2}=1716$, while $\Delta=20$. It should be understood that the values of A are needed to compensate for the inaccuracies of the processing clock VCO 38 when it is in the unlocked state. However, one the VCO 38 is locked, the horizontal analyzer 14 may then determine, accurately, the true horizontal rate.

Figure 10:
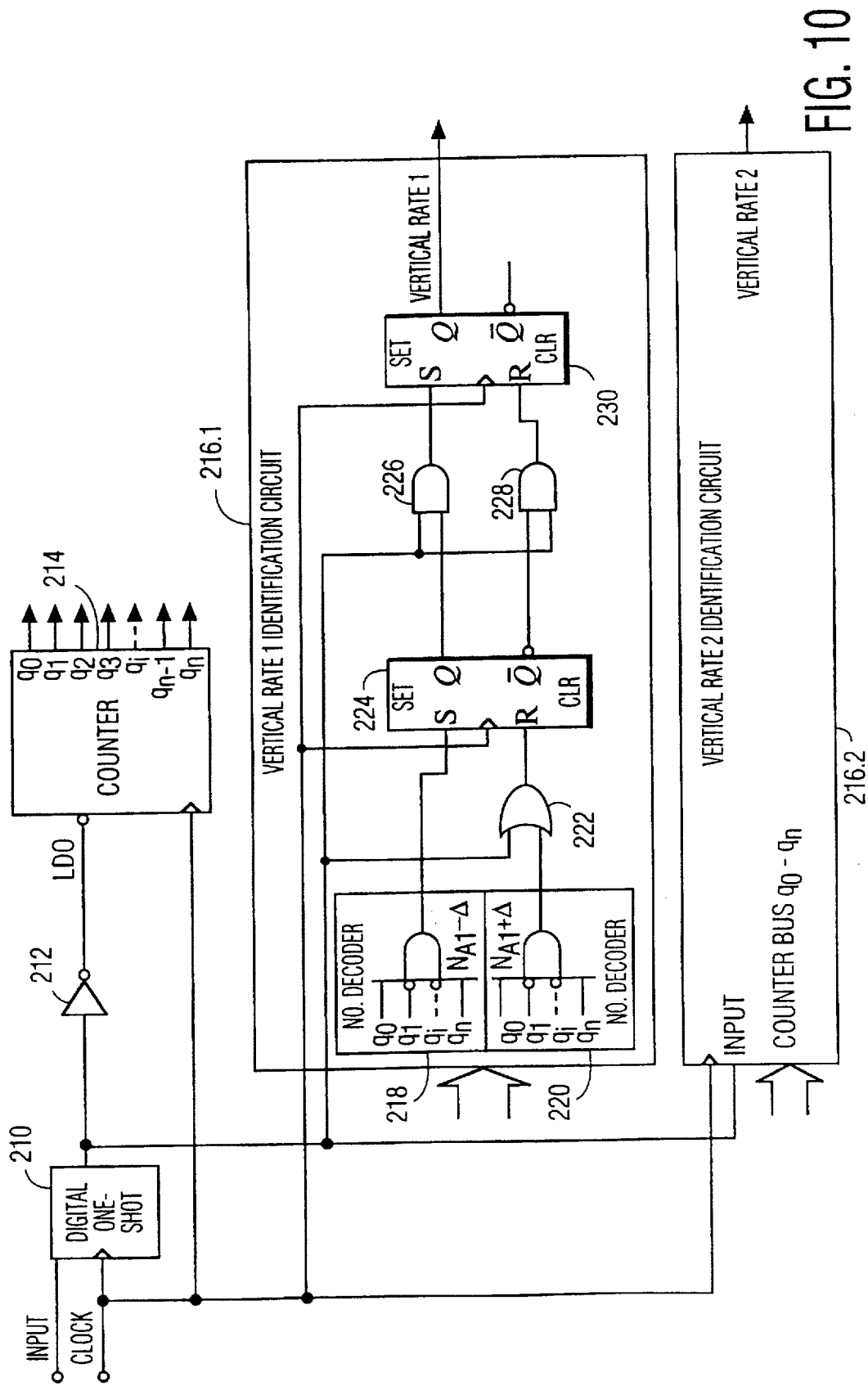
FIG. 10 shows a block diagram of the vertical analyzer for the apparatus of FIG. 1.

FIG. 10 shows a block diagram of the vertical analyzer 28 of the apparatus of FIG. 1. In particular, the output from the multiplexer 26 is applied to a first input and the output from the processing clock VCO 38 is applied to a second input of the vertical analyzer 28. A digital one-shot circuit 210 has an input coupled to the first input and a clock input coupled to the second input. An output from the digital oneshot circuit 210 is applied to an inverter 212 which applies an output signal to a reset input of counter 214, which also receives the clock signal on the second input as a counting input. The data outputs $q_0-q_n$ from the counter 214 are applied to data inputs of a first and a second vertical rate identification circuit 216.1 and 216.2, corresponding to the two expected vertical rates (29.97 Hz. and 30 Hz.). Each identification circuit 216.1 and 216.2 also include a first input coupled to the second input of the vertical analyzer 28 carrying the clock signal, and a second input coupled to the output of the digital one-shot circuit 210. Number decoders 218 and 220 receive the data signals on the data inputs. An OR-gate 222 has a first input coupled to the second input of the identification circuit 216.i and a second input coupled to the output of the second decoder 220. A first RS flip-flop 224 has a clock input coupled to the first input of the identification circuit 216.i, an S input coupled to the output of the first number decoder 218 and an R input coupled to the output of the OR-gate 222. A first AND-gate 226 has an input coupled to the Q output of the first RS flip-flop 224 and a second input coupled to the second input of the identification circuit 216.i. A second AND-gate 228 has a first input coupled to the $\bar{Q}$ output of the first RS flip-flop 224, and a second input coupled to the second input of the identification circuit 216.i. A second RS flip-flop 230 has a clock input coupled to the first input of the identification circuit 216.i, an S input coupled to an output of the first AND-gate 226 and an R input coupled to an output of the second AND-gate 228. The Q output of the second RS flip-flop 230 carries the identification signal for the appropriate identification circuit 216.i.

The vertical analyzer 28 starts operation when the horizontal rate is approximately identified and the composite synchronizing signal is stripped. The vertical analyzer 28, having similar operating principles as the horizontal analyzer 14, works with strictly periodic input pulses without requiring the double frequency protection. The counter 214 requires a much higher number of bits than the counter 174 in the horizontal analyzer 14, to be able to count processing clock periods for the longest of supported frame periods. The first RS flip-flop 224 of the identification circuit 216.i provides the vertical expectation window signal, and the second RS flip-flop 230 is set if the vertical pulse comes inside of the expectation window. In this case, the corresponding vertical rate identification signal is provided, after which the arrival of the vertical pulse outside of the window results in the reset of the second RS flip-flop 230 and in the termination of the output identification signal.

In a practical embodiment of the vertical analyzer 28, the vertical rate identification circuits 216.1 and 216.2 identify frame rates of 29.97 Hz. and 30 Hz., where in the respective counts are $N_{A1}$=900,900, and $N_{A2}$=900,000, respectively, where $\Delta$=100 in both cases.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A method for identifying a frequency rate of an input signal out of a plurality of known frequency rates, where signals at said known frequency rates are periodic pulse signals for a substantial portion of time periods and may suffer doubling of frequency during periodic known time intervals of said time periods, said method comprising the steps:

receiving the input signal;

generating a high frequency clock pulse signal having a known frequency rate, said known frequency rate being variable within a known frequency band;

counting a number of pulses in said high frequency clock pulse signal occurring during a period of said analyzed signal;

estimating an expectation window for each of said plurality of known frequency rates;

identifying a particular one of said plurality of known frequency rates by determining in which expectation window pulses in said analyzed signal occur for a predetermined number of consecutive times; and filtering out a doubling of frequency by using an appropriate state machine to avoid false indications of a non-match.

2. A method for identifying an input signal as set forth in claim 1, characterized in that said filtering out step comprises:

temporarily maintaining said identification of the appropriate rate; and checking whether alternate ensuing pulses in said analyzed signal occur within the appropriate window.

3. A method for identifying a frequency rate of an input signal as set forth in claim 1, characterized in that said step of estimating an expectation window comprises:

determining, for each of said plurality of known frequency rates, a number of said clock pulses which would occur in one period of a signal at said known frequency rate;

setting a tolerance around each of said determined numbers thereby forming a low count number and a high count number; and forming said expectation window by determining when said number in said counting step reaches said low count number and then said high count number.

4. An analyzer for determining a frequency rate of an input signal, where signals at said known frequency rates are periodic pulse signals for a substantial portion of time periods and may suffer doubling of frequency during periodic known time intervals of said time periods, said analyzer comprising:

an input for receiving the input signal;

means for generating a high frequency clock pulse signal having a known frequency rate, said known frequency rate being variable within a known frequency band;

means for counting a number of pulses in said high frequency clock pulse signal occurring during a period of said input signal; and a plurality of frequency rate identification circuits corresponding, respectively, to said plurality of known frequency rates, each of said frequency rate identification circuits comprising:

means for estimating an expectation window for each of said plurality of known frequency rates;

a state machine for determining whether said input signal has pulses which occur within said expectation window for a predetermined number of times consecutively;

an output for supplying an identification signal; and means for filtering out a doubling of frequency to avoid false indications of a non-match.

5. An analyzer as set forth in claim 4, characterized in that said filtering out means comprises:

means for temporarily maintaining said identification of the appropriate rate; and means for checking whether alternate ensuing pulses in said input signal occur within the appropriate window.

6. An analyzer as set forth in claim 4, characterized in that said means for estimating an expectation window comprises:

means for setting, for each of said plurality of known frequency rates, a number of said clock pulses which would occur in one period;

means for setting a tolerance around each of said set numbers thereby forming a low count number and a high count number; and means for forming said expectation window by determining when said number in said counting means reaches said low count number and then said high count number.

7. An analyzer as set forth in claim 4, characterized in that said means for counting comprises:

a counter coupled to said generating means for counting pulses in the clock signal;

a digital one-shot circuit having a clock signal input coupled to said generating means for receiving said clock signal, and a data input for receiving the input signal appearing at the input of the analyzer, said digital one-shot circuit, upon receipt of a pulse in said input signal, generating a pulse at the beginning of a next clock pulse; and an inhibitor having a first input coupled to an output of said digital one-shot circuit, and a plurality of second inputs coupled to non-identification outputs of said plurality of frequency rate identification circuits, an output of said inhibitor being coupled to a reset input of said counter.

8. An analyzer as set forth in claim 4, characterized in that in each of said frequency rate identification circuits, said means for estimating an expectation window comprises:

a first number decoder coupled to outputs of said counting means for determining the relationship $N_{STDi}-\Delta$, where $N_{STDi}$ represents a number of said clock pulses expected to occur between each pulse in the input signal at the relevant rate, and $\Delta$ represents an integer error value;

a second number decoder also coupled to outputs of said counting means for determining the relationship $N_{STDi}+\Delta$; and a first flip-flop being set by said first number decoder and reset by said second number decoder.

9. An analyzer as set forth in claim 8, characterized in that said first flip-flop is alternatively reset by the output from said digital one-shot circuit.

10. An analyzer as set forth in claim 9, characterized in that in each of said frequency rate identification circuits, said state machine comprises:

a second, a third, and a fourth flip-flop, each of said second, third and fourth flip-flops having a clock input, a set (S) input, a reset (R) input, a Q output and a $\overline{Q}$ output;

first means for determining a concurrence of a signal at the Q output of said first flip-flop and the output signal from said digital one-shot circuit;

second means for determining a concurrence of a signal at the $\overline{Q}$ output of said first flip-flop and the output signal from said digital one-shot circuit;

third means for determining a concurrence of signals at the Q outputs of said first and second flip-flops and the output signal from said digital one-shot circuit;

fourth means for determining a concurrence of signals at the $\overline{Q}$ outputs of said first and second flip-flops and the output signal from said digital one-shot circuit;

fifth means for determining a concurrence of signals at the Q outputs of said first, second and third flip-flops and the output signal from said digital one-shot circuit;

sixth means for determining a concurrence of signals at the $\overline{Q}$ outputs of said first, second and third flip-flops and the output signal from said digital one-shot circuit; and seventh means for determining a concurrence of signals at the Q outputs of said second, third and fourth flip-flops and the $\overline{Q}$ output of said first flip-flop;

the S input of said second flip-flop being coupled to an output of said first-determining means, and the R input of said second flip-flop being coupled to an output of said second determining means; the S input of said third flip-flop being coupled to an output of said third determining means, and the R input being coupled to an output of said fourth determining means; the S input of said fourth flip-flop being coupled to an output of said fifth determining means, and the R input of said fourth flip-flop being coupled to an output of said sixth determining means, said reset prohibition signal being formed by an output from said seventh determining means, and said identification signal being formed by the Q output from the fourth flip-flop.

11. An analyzer as set forth in claim 10, characterized in that said first, second, third, fourth, fifth, sixth and seventh determining means each comprises an AND-gate.

12. A method for automatically synchronizing a video system to a composite synchronizing signal in accordance with one of a plurality of known video standards, said method comprising the steps:

receiving the composite synchronizing signal;

generating a high frequency clock signal with a known pulse frequency controlled within a narrow frequency band;

determining whether said composite synchronizing signal is bi-level or tri-level;

dividing said composite synchronizing signal into a first signal containing the positive portions and a second signal containing the negative portions, if said composite synchronizing signal is tri-level, forming a second signal of negative portions of said composite synchronizing signal is bi-level;

means for analyzing one of said first and said second signals to determine an approximate horizontal frequency rate;

stripping the composite synchronizing signal to separate horizontal synchronizing pulses and vertical synchronizing pulses contained therein using the approximate horizontal frequency rate determined in the horizontal analyzing step;

vertical analyzing the stripped vertical synchronizing pulses to determine an accurate vertical rate;

locking said high frequency clock signal to the stripped horizontal synchronizing pulses; and identifying one of said plurality of known video standards for which said composite synchronizing signal is in accordance, characterized in that said horizontal analyzing step comprises:

counting a number of pulses in said high frequency clock pulse signal occurring during a period of said analyzed signal;

estimating an expectation window for each of a plurality of known horizontal frequency rates in said plurality of known video standards; and identifying a particular one of said plurality of known horizontal frequency rates by determining in which expectation window an analyzed pulse in said analyzed signal occurs for a predetermined number of times.

13. A method for automatically synchronizing a video system as set forth in claim 12, characterized in that said horizontal analyzing step further comprises:

filtering out a doubling of frequency, occurring during vertical blanking periods, by using an appropriate state machine to avoid false indications of a non-match.

14. A method for automatically synchronizing a video system as set forth in claim 13, characterized in that said filtering out step comprises:

temporarily maintaining said identification of the appropriate rate; and checking whether alternate ensuing pulses in said analyzed signal occur within the appropriate window.

15. A method for automatically synchronizing a video system as set forth in claim 12, characterized in that said step of estimating an expectation window comprises:

setting, for each of said plurality of known horizontal frequency rates, a number of said clock pulses which would occur in one line period;

setting a tolerance around each of said determined numbers thereby forming a low count number and a high count number; and forming said expectation window by determining when said number in said counting step reaches said low count number and then said high count number.

16. A method for automatically synchronizing a video system as set forth in claim 12, characterized in that said vertical analyzing step comprises:

counting a number of pulses in said high frequency clock pulse signal occurring during a period of said analyzed vertical synchronizing signal;

estimating an expectation window for each of a plurality of known vertical frequency rates in said plurality of known video standards; and identifying a particular one of said plurality of known vertical frequency rates by determining in which expectation window a pulse in said analyzed vertical synchronizing signal occurs for a predetermined number of times.

17. A method for automatically synchronizing a video system as set forth in claim 16, characterized in that said step of estimating an expectation window comprises:

determining, for each of said plurality of known vertical frequency rates, a number of said clock pulses which would occur in one frame period;

setting a tolerance around each of said determined numbers thereby forming a low count number and a high count number; and forming said expectation window by determining when said number in said counting step reaches said low count number and then said high count number.

18. An apparatus for automatically synchronizing a video system to a composite synchronizing signal in accordance with one of a plurality of known video standards, said apparatus comprising:

an input for receiving the composite synchronizing signal;

a high frequency clock signal generator for generating a clock signal with a known pulse frequency controlled to within a known narrow band;

means for determining whether said composite synchronizing signal is bi-level or tri-level;

means for dividing said composite synchronizing signal into a first signal containing the positive portions and a second signal containing the negative portions, if said composite synchronizing signal is tri-level, and for forming said second signal containing the negative portions if said composite synchronizing signal is bi-level;

a first analyzer for analyzing either the first or second signal to determine an approximate horizontal frequency rate, said first analyzer having an input coupled to said dividing means, and a clock input coupled to an output of said high frequency clock signal generator;

means, coupled to said dividing means and to said first analyzer, for stripping the composite synchronizing signal to separate the horizontal synchronizing signal and a vertical synchronizing signal contained therein using the approximate horizontal frequency rate determined in the first analyzer;

a second analyzer, coupled to an output of said stripping means and to said high frequency clock signal generator, for analyzing the stripped vertical synchronizing signal to determine an accurate vertical rate;

means for locking said high frequency clock signal generator to the stripped horizontal pulses; and means for identifying one of said plurality of known video standards for which said composite synchronizing signal is in accordance, characterized in that said first analyzer comprising:

an input for receiving one of the first and second signals;

an input for receiving said high frequency clock pulse signal;

means for counting a number of pulses in said high frequency clock pulse signal occurring during a period of said analyzed signal; and a plurality of horizontal rate identification circuits corresponding, respectively, to said plurality of known horizontal frequency rates, each of said horizontal rate identification circuits comprising:

means for forming an expectation window for each of said plurality of known horizontal rates;

a state machine for determining whether an analyzed signal has pulses which occur within said expectation window for a predetermined number of times consecutively; and an output for supplying an identification signal.

19. An apparatus for automatically synchronizing a video system as set forth in claim 18, characterized in that said state machine further comprises:

means for filtering out a doubling of frequency by using an appropriate state machine to avoid false indications of a non-match.

20. An apparatus for automatically synchronizing a video system as set forth in claim 19, characterized in that said filtering out means comprises:

means for temporarily maintaining said identification of the appropriate rate; and means for checking whether alternate ensuing pulses in said analyzed signal occur within the appropriate window.

21. An apparatus for automatically synchronizing a video system as set forth in claim 18, characterized in that said means for estimating an expectation window comprises:

means for setting, for each of said plurality of known horizontal rates, a number of said clock pulses which would occur in one line period;

means for setting a tolerance around each of said set numbers thereby forming a low count number and a high count number; and means for forming said expectation window by determining when said number in said counting step reaches said low count number and then said high count number.

22. An apparatus for automatically synchronizing a video system as set forth in claim 18, characterized in that said means for counting comprises:

a counter coupled to said generating means for counting pulses in the clock signal;

a digital one-shot circuit having a clock signal input coupled to said generating means for receiving said clock signal, and a data input for receiving the analyzed signal, said digital one-shot circuit, upon receipt of a pulse in said analyzed signal, generating a pulse at the beginning of a next clock pulse; and an inhibitor having a first input coupled to an output of said digital one-shot circuit, a plurality of second inputs coupled to non-identification outputs of said plurality of horizontal rate identification circuits, an output of said inhibitor being coupled to a reset input of said counter.

23. An apparatus for automatically synchronizing a video system as set forth in claim 18, characterized in that in each of said horizontal rate identification circuits, said means for estimating an expectation window comprises:

a first number decoder coupled to outputs of said counting means for determining the relationship $N_{STDi}-\Delta$, where $N_{STDi}$ represents a number of said clock pulses expected to occur between each horizontal synchronizing pulse at the relevant rate, and $\Delta$ represents an integer error value;

a second number decoder also coupled to outputs of said counting means for determining the relationship $N_{STDi}+\Delta$; and a first flip-flop being set by said first number decoder and reset by said second number decoder.

24. An apparatus for automatically synchronizing a video system as set forth in claim 23, characterized in that said first flip-flop is alternatively reset by the output from said digital one-shot circuit.

25. An apparatus for automatically synchronizing a video system as set forth in claim 23, characterized in that in each of said horizontal rate identification circuits, said state machine comprises:

a second, a third, and a fourth flip-flop, each of said second, third and fourth flip-flops having a clock input, a set (S) input, a reset (R) input, a Q output and a $\bar{Q}$ output;

first means for determining a concurrence of a signal at the Q output of said first flip-flop and the output signal from said digital one-shot circuit;

second means for determining a concurrence of a signal at the $\bar{Q}$ output of said first flip-flop and the output signal from said digital one-shot circuit;

third means for determining a concurrence of signals at the Q outputs of said first and second flip-flops and the output signal from said digital one-shot circuit;

fourth means for determining a concurrence of signals at the $\bar{Q}$ outputs of said first and second flip-flops and the output signal from said digital one-shot circuit;

fifth means for determining a concurrence of signals at the Q outputs of said first, second and third flip-flops and the output signal from said digital one-shot circuit;

sixth means for determining a concurrence of signals at the $\bar{Q}$ outputs of said first, second and third flip-flops and the output signal from said digital one-shot circuit; and seventh means for determining a concurrence of signals at the Q outputs of said second, third and fourth flip-flops and the $\bar{Q}$ output of said first flip-flop;

the S input of said second flip-flop being coupled to an output of said first determining means, and the R input of said second flip-flop being coupled to an output of said second determining means; the S input of said third flip-flop being coupled to an output of said third determining means, and the R input being coupled to an output of said fourth determining means; the S input of said fourth flip-flop being coupled to an output of said fifth determining means, and the R input of said fourth flip-flop being coupled to an output of said sixth determining means, said reset prohibition signal being formed by an output from said seventh determining means, and said identification signal being formed by the Q output from the fourth flip-flop.

26. An apparatus for automatically synchronizing a video system as set forth in claim 25, characterized in that said first, second, third, fourth, fifth, sixth and seventh determining means each comprises an AND-gate.

27. An apparatus for automatically synchronizing a video system as set forth in claim 18, characterized in that said second analyzer comprises:

an input for receiving the vertical synchronizing signal;

an input for receiving said high frequency clock pulse signal;

means for counting a number of pulses in said high frequency clock pulse signal occurring during a period of said vertical synchronizing signal; and a plurality of vertical rate identification circuits corresponding, respectively, to said plurality of known vertical frequency rates, each of said vertical rate identification circuits comprising:

means for estimating an expectation window for each of said plurality of known vertical frequency rates;

a state machine for determining whether the vertical synchronizing signal has pulses which occur within said expectation window for a predetermined number of times consecutively; and an output for supplying an identification signal.

28. An apparatus for automatically synchronizing a video system as set forth in claim 27, characterized in that in said second analyzer, said means for estimating an expectation window comprises:

means for determining, for each of said plurality of known vertical frequency rates, a number of said clock pulses which would occur in one vertical period;

means for setting a tolerance around each of said determined numbers thereby forming a low count number and a high count number; and means for forming said expectation window by determining when said number in said counting means reaches said low count number and then said high count number.

29. An apparatus for automatically synchronizing a video system as set forth in claim 28, characterized in that in said second analyzer, said means for counting comprises:

a counter coupled to said generating means for counting pulses in the clock signal;

a digital one-shot circuit having a clock signal input coupled to said generating means for receiving said clock signal, and a data input for receiving the analyzed signal, said digital one-shot circuit, upon receipt of a pulse in said analyzed signal, generating a pulse at the beginning of a next clock pulse; and an inverter having an input coupled to an output of said digital one-shot circuit, and an output coupled to a reset input of said counter.

30. An apparatus for automatically synchronizing a video system as set forth in claim 27, characterized in that in each of said vertical rate identification circuits, said means for estimating an expectation window comprises:

a first number decoder coupled to outputs of said counting means for determining the relationship $N_{STDi}-\Delta$, where $N_{STDi}$ represents a number of said clock pulses expected to occur between each vertical synchronizing pulse at the relevant rate, and $\Delta$ represents an integer error value;

a second number decoder also coupled to outputs of said counting means for determining the relationship $N_{STDi}+\Delta$; and a first flip-flop being set by said first number decoder and reset by said second number decoder.

31. An apparatus for automatically synchronizing a video system as set forth in claim 30, characterized in that in each of said vertical rate identification circuits, said state machine comprises:

second flip-flop having a set input and a reset input, said first and second flip-flops each also having a clock input coupled to receive the high frequency clock signal, a Q output and a $\overline{Q}$ output;

first means for determining a concurrence of a signal at the Q output of said first flip-flop and the output signal from said digital one-shot circuit; and second means for determining a concurrence of a signal at the $\overline{Q}$ output of said first flip-flop and the output signal from said digital one-shot circuit, an output from said first means being coupled to the set input of said second flip-flop and an output from said second means being coupled to the reset input of the second flip-flop, the Q output of said second flip-flop carrying the vertical rate identification signal.

32. A vertical analyzer as claimed in claim 31, characterized in that said first and second determining means each comprises an AND-gate.

* * * * *